United States Patent [19]

Swetish

[11] Patent Number: 5,742,988
[45] Date of Patent: Apr. 28, 1998

[54] QUICK-RELEASE PIN LATCH ASSEMBLY

[75] Inventor: Thomas R. Swetish, Racine, Wis.

[73] Assignee: Johnson Worldwide Associates, Inc., Sturtevant, Wis.

[21] Appl. No.: 670,586

[22] Filed: Jun. 26, 1996

[51] Int. Cl.$^6$ ..................................................... A44B 17/00
[52] U.S. Cl. .................................................................. 24/667
[58] Field of Search .................................... 411/523, 522; 24/662, 666, 667, 701; 224/628, 637

[56] References Cited

U.S. PATENT DOCUMENTS

| | | | |
|---|---|---|---|
| 244,171 | 7/1881 | Beach | 24/667 |
| 361,593 | 4/1887 | Mueller | 24/667 |
| 720,451 | 2/1903 | Luellen | 24/666 |
| 970,931 | 9/1910 | Kramer | 24/667 |
| 1,219,415 | 3/1917 | Muller | 24/667 |
| 2,193,802 | 3/1940 | Chambless et al. | 24/667 |
| 3,442,427 | 5/1969 | Arnell et al. | |
| 4,145,583 | 3/1979 | Oshgan et al. | 24/667 X |
| 4,512,159 | 4/1985 | Memmen | |
| 4,676,418 | 6/1987 | Lowe | |
| 4,884,731 | 12/1989 | Sibley | |
| 4,999,887 | 3/1991 | Kraus | 24/662 |
| 5,609,278 | 3/1997 | Fresco | 224/637 X |

FOREIGN PATENT DOCUMENTS

| | | | |
|---|---|---|---|
| 449445 | 2/1913 | France | 24/667 |
| 785814 | 8/1935 | France | 24/667 |
| 59939 | 11/1891 | Germany | 24/667 |

*Primary Examiner*—James R. Brittain
*Attorney, Agent, or Firm*—Foley & Lardner

[57] ABSTRACT

A quick-release pin latch assembly comprises a first latch member configured for locking engagement with and a second latch member. The first latch member includes a body member and a load bearing post or pin extending outwardly from the body member. The load pin has an enlarged head portion offset from the body member by a shank portion. The second latch member includes a base plate and a somewhat flexible, elongate latch plate. The latch plate is anchored at one of its ends to the base plate, wherein the latch plate is biased to remain in substantial contact with the base plate. The base plate has a pin receiving elongate opening. The elongate opening is large enough at one end to allow the head portion of the pin to pass. The elongate opening is reduced at an opposite end to receive and establish coupling engagement with the shank portion of the pin. The latch plate has a retaining hole to receive and establish coupling engagement with the head portion of the pin. The assembly is latched by inserting the pin transversely through the enlarged end of the elongate opening to cause the latch plate to flex away from the base plate, and then moving the pin laterally toward the reduced end of the elongate opening until the head portion of the pin is received within the retaining hole of the latch plate. The latch plate then resumes substantial contact with the base plate, whereby the assembly is locked.

15 Claims, 2 Drawing Sheets

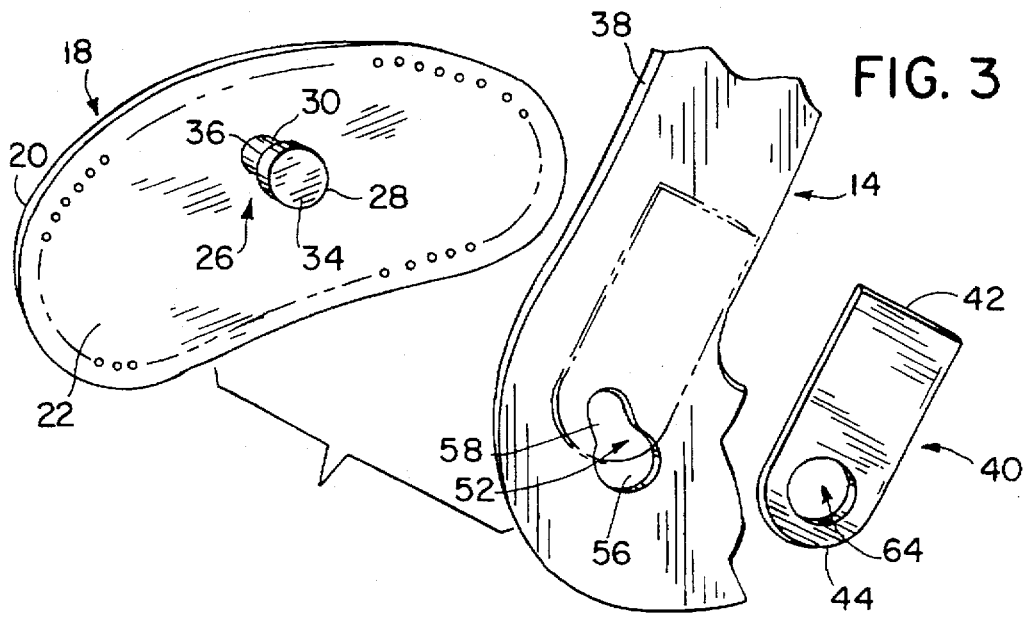
FIG. 3
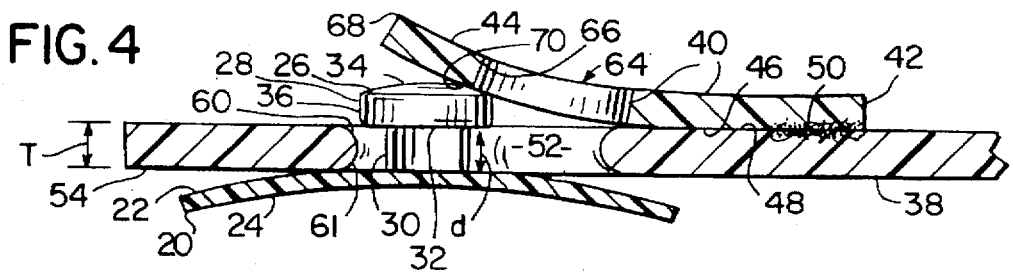
FIG. 4
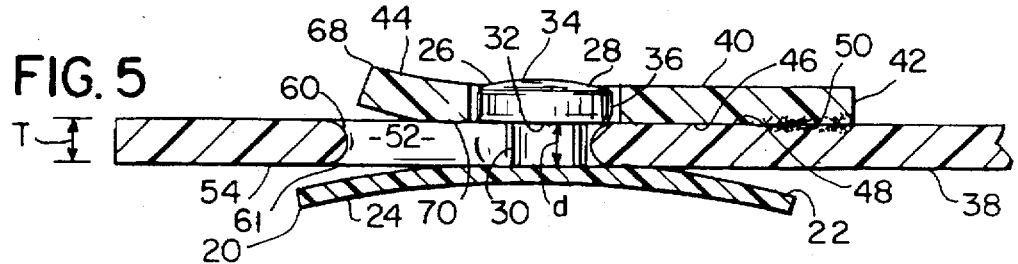
FIG. 5
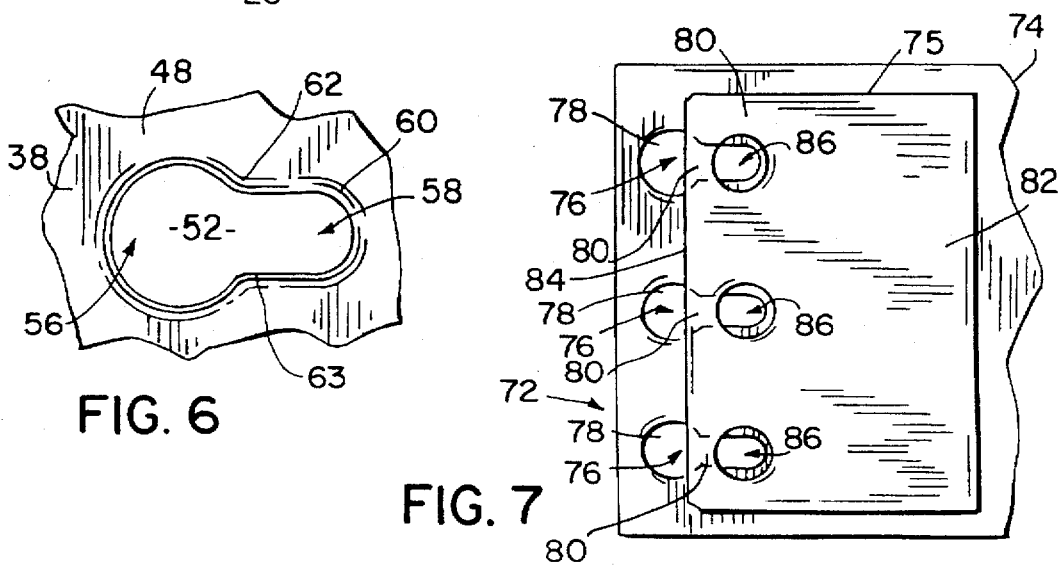
FIG. 6
FIG. 7

QUICK-RELEASE PIN LATCH ASSEMBLY

BACKGROUND OF THE INVENTION

The present invention relates to a quick release assembly for holding a retaining a pin in engagement with a support member. More particularly, the invention relates to a novel pin latch assembly for releasably and pivotally attaching elements of a load support system, such as a hip belt and support frame in a backpack, SCUBA tank support or the like.

A wide variety of applications exist for releasable pivotal connections between a support element and a supported element. An example of one such application is in the pivotal connection of elements of load carrying systems, such as backpacks and SCUBA tank supports. One important object often associated with such apparatus is to provide a load support frame with a connecting device by which a major portion of the load is carried by the hips of the user. For example, in one such system, a padded hip belt is tightened about the hips of the user and attached to the load support frame designed to be positioned behind the use's back. A characteristic common to most known backpacks and SCUBA tank supports is that they impede the user's forward and backward movement during use. Accordingly, such support structures often prove uncomfortable or unwieldy to use, particularly during sports activities, such as trekking, cross-country skiing and swimming.

Although attempts have been made to afford pivotal movement in such load support structures, these have not proved satisfactory. There remains a need for an improved quick release pivotal support structure for such applications that provides reliable and sturdy load carrying capacity in a form that is easy to operate and relatively inexpensive to manufacture. Moreover, there is a need for such a structure that functions well in a variety of environments, including extremes of hot and cold, and in both dry and wet applications, as might be encountered in outdoor sports and underwater diving.

SUMMARY OF THE INVENTION

The invention relates to a quick release pin and latch assembly designed to respond to these needs and particularly well suited to incorporation in backpacks, buoyancy compensators, SCUBA tank supports and similar applications. By way of example, in a backpack support system the assembly may be used to allow a hip belt to be quickly latched to and unlatched from a backpack frame. The assembly may be easily engaged and disengaged by a user without the need for separate or special tools. Further, despite the ease with which the assembly may be unlatched when desired, it remains securely locked once engaged, transmitting loads between supported and supporting elements through a pin, without unduly stressing the latching structure loading. In a preferred embodiment described below, the latch assembly may be configured to allow relative pivotal movement of the supporting and supported structures.

Thus, in accordance with one aspect of the invention, a quick-release pin latch assembly comprises a first latch member configured for locking engagement with a second latch member. The first latch member includes a body member and a load bearing post or pin extending outwardly from the body member. The load pin has an enlarged head offset from the body member by a shank. The second latch member includes a base plate and a deformable, elongate latch plate. The latch plate is anchored at one of its ends to the base plate and is biased toward the base plate. The base plate has an elongate opening or slot for receiving the pin. The elongate opening is large enough at one end to allow the head portion of the pin to be inserted therethrough. A portion of the opening at an opposite end is of smaller dimensions to receive and establish coupling engagement with the shank portion of the pin. The latch plate has a retaining hole to receive and establish coupling engagement with the head portion of the pin. The assembly is latched by inserting the pin through the enlarged end of the elongate opening to cause the latch plate to flex away from the base plate, and then moving the pin toward the smaller portion of the opening until the head portion of the pin is received within the retaining hole of the latch plate. The latch plate then resumes substantial contact with the base plate, whereby the assembly is locked.

In accordance with another aspect of the invention, a quick-release latch assembly comprises a first object configured for locking engagement with a second object. The first object comprises a body member and a post extending outwardly from the body member. The post has an enlarged head offset from the body by a shank. The second object includes a base member and a latch member. The latch member is fixedly secured to the base member and biased into a latched position. The base member has an elongate opening for receiving the post. The elongate opening is enlarged at one end, permitting passage of the head therethrough and of smaller dimensions at an opposite end for receiving and establishing coupling engagement with the shank. The latch member has a retaining hole for receiving and establishing coupling engagement with the head of the post. The latch member partly overlies the enlarged end opening of the base member and the retaining hole partly overlies the reduced end opening of the base member. The assembly is latched by inserting the post transversely through the enlarged end of the elongate opening to cause the latch member to move away from the retaining hole, and then moving the post laterally toward the reduced end of the elongate opening until the head of the post is received within the retaining hole of the latch member. The latch member then resumes its biased latching position, whereby the assembly is locked.

In accordance with a particularly preferred aspect of the invention, the shank and head portions of the pin are cylindrical and the retaining hole is circular. Thus, the pin is permitted to function as a pivot pin in the locked position.

Other objects, features, and advantages of the various aspects of the invention will be apparent from the following detailed description when read with the accompanying drawings. These drawings show, by way of example and not limitation, structure for practicing the invention. That is, the drawings are for the purpose of illustration and description only and are not intended as a definition of the limits of the invention.

BRIEF DESCRIPTION OF THE DRAWINGS

The present invention will become more fully understood from the following detailed description, taken in conjunction with the accompanying drawings, wherein like reference numerals refer to like parts, in which:

FIG. 3 is an exploded perspective view of the latch assembly of FIG. 2;

FIG. 4 is a top sectional view of the latch assembly of FIG. 2 taken along line 4—4 illustrating the latch assembly in the partially latched position;

FIG. 5 is a top sectional view of the latch assembly of FIG. 2 taken along line 4—4 illustrating the latch assembly in the fully latched position;

FIG. 6 is an enlarged fragmentary front elevation view of the base plate of the latch assembly; and FIG. 7 is a view of a preferred alternative embodiment of the invention.

DESCRIPTION OF THE PREFERRED EMBODIMENTS

Figure 1:
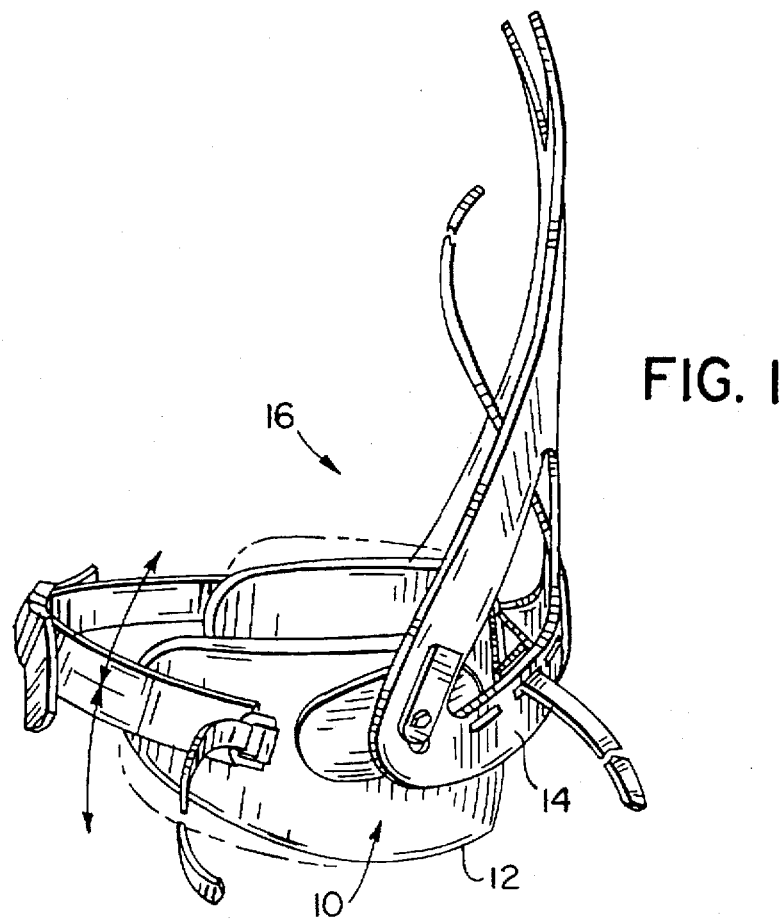
FIG. 1 is a perspective view of an exemplary latch assembly of the invention shown in use with a load support system, such as a backpack.

Turning now to the drawings and referring to FIG. 1, a latch assembly 10 is shown employed for releasably attaching a hip belt 12 to a flexible frame 14 to form a backpack support system 16. Flexible frame 14 is preferably made from a moldable plastic material, such as ABS.

Figure 2:
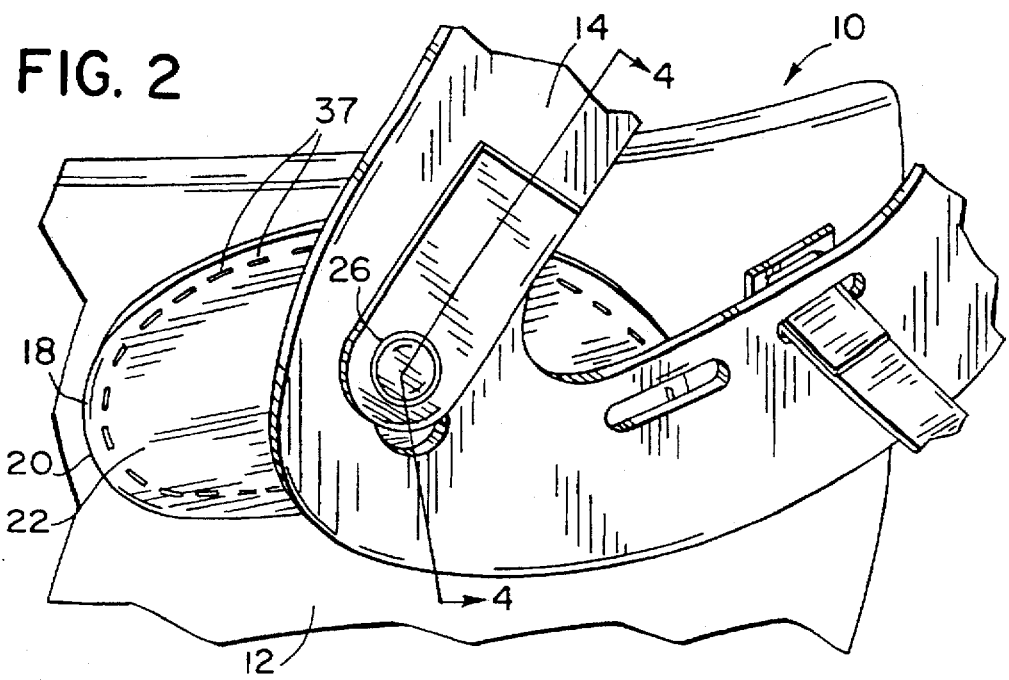
FIG. 2 is an enlarged fragmentary perspective view of the latch assembly of FIG. 1.

Referring now to FIGS. 2 through 5, latch assembly 10 comprises a hip plate 18 configured for locking engagement with flexible frame 14. Hip plate 18 includes a thin, slightly bowed body member 20 having a convex face 22 and a concave face 24. Hip plate 18 also includes a load bearing pin 26 extending outwardly from convex face 22. Pin 26 has an enlarged head portion 28 offset a distance d from body member 20 by a shank portion 30. Head portion 28 has an inner annular face 32, an outer circular face 34, and a cylindrical edge 36. Hip plate 18 may be attached to hip belt 12 by sewing, as illustrated in FIG. 2, or by some alternative method, such as by means of a hook and loop fastening system. Hip plate 18 is preferably made from a sturdy, modable plastic material, such as ABS.

Turning now to FIGS. 4 and 5, flexible frame 14 includes a frame base or base plate 38 and a flexible, elongate latch plate or tab 40. Frame base 38 has a thickness t which is slightly less than distance d at which head portion 28 is offset from body member 20. Latch tab 40 has a distal end 42 and a proximal end 44. Latch tab 40 is secured along a face 46 near distal end 42 to fixedly secure latch tab 40 to a face 48 of frame base 38. Thus, face 46 of latch tab 40 is biased toward face 48 of frame base 38. Latch tab 40 may be secured to frame base 38 by any method known in the art suitable for the materials used, such as by an RF weldment 50, if plastics are used, gluing, riveting or a similar procedure.

As shown in FIGS. 3 and 6, frame base 38 includes a elongate opening 52 extending from face 48 to an opposite face 54. Elongate opening 52 has an enlarged end 56 of sufficient size to allow head portion 28 of pin 26 to pass therethrough, and an end 58 or reduced dimensions for receiving and establishing coupling engagement with shank portion 30 of pin 26. Preferably, elongate opening 52 has a generally rounded, smooth edge 60 circumscribing elongate opening 52 along face 48 and a generally rounded, smooth edge 61 circumscribing elongate opening 52 along face 54 (see FIGS. 4 and 5). Also preferably, elongate opening 52 has a pair of generally rounded, smooth transition edges 62, 63 between enlarged end 56 and reduced end 58.

Turning now to FIGS. 4 and 5, latch tab 40 has a pin retaining hole 64 for receiving head portion 28 of pin 26, wherein hole 64 is defined by a cylindrical head engaging edge 66 for engaging cylindrical edge 36 of head portion 28 of pin 26. Retaining hole 64 of latch tab 40 overlies reduced end 58 and is larger in diameter than the width of reduced end 58. Proximal end 44 of latch tab 40 extends over retaining hole 64 and is preferably bent slightly away from retaining hole 64 to form an upturned lip 68 for ensuring that latch tab 40 is easy for a user to manipulate. The portion of latch tab 40 extending over enlarged end 56 of elongate opening 52 thus forms a cam 70 on latch tab 40.

Latch assembly 10 is latched by inserting pin 26 through enlarged end 56 of elongate opening 52. This movement causes circular face 34 of head portion 28 to press into cam 70 of latch tab 40, thus causing latch tab 40 to flex away from frame base 38 (see FIG. 4). Pin 26 is then moved along elongate opening 52 toward reduced end 58 until head portion 28 of pin 26 is lined up with retaining hole 64 of latch tab 40. At this point, circular face 34 disengages from cam 70, and latch tab 40 snaps back into its biased latching position adjacent to frame base 38. Latch assembly 10 is now securely locked (see FIG. 5).

Latch assembly 10 is easily unlatched by a similar sequence. To begin, upturned lip 68 is pulled upward by a user to cause latch tab 40 to flex away from frame base 38. Pin 26 is then moved laterally along elongate opening 52 toward enlarged end 56. When head portion 28 of pin 26 is clear of reduced end 58 and lined up with enlarged end 56, head portion 28 can be moved transversely back through enlarged end 56 to fully disengage the assembly.

Referring now to FIG. 7, one member 72 of an alternative embodiment of the invention is illustrated. Member 72 includes a plurality of elongate openings 74, each opening 74 having an enlarged end 76 and a reduced end 78. A generally rectangular, flexible latch plate 80 is fixedly secured to member 72 along a distal edge 82, biasing latch plate 80 toward member 72. Member 72 includes a proximal edge 84 overlying enlarged ends 76 of elongate openings 74, and a plurality of pin receiving openings 86 overlying reduced ends 78 of elongate openings 74. The plurality of elongate openings 74 are all in a substantially identical orientation. Although the complimentary locking member of member 72 is not shown for reasons of brevity, the structure of such member will be sufficiently clear to one of ordinary skill from the foregoing description of assembly 10.

While the embodiments illustrated in the FIGURES and described above are presently preferred, these embodiments are offered by way of example only, and the invention is not limited to the specific forms shown. For example, rather than the shank of the pivot pin being cylindrical, a cuboidal shank could be employed if it is desirable that the latch assembly pass torque. This and other modifications may be made in the design and arrangement of the elements without departing from the scope of the invention as expressed in the appended claims.

I claim:

1. A quick-release latch assembly comprising:

a first rigid load supporting element including a body member and a load pin extending outwardly therefrom, the load pin having an enlarged head portion offset from the body member by a shank portion, the body member being an outwardly bowed pad; and a second rigid load supporting element including a rigid, generally flat, thin, base plate and a flexible, elongate, generally flat, thin, latch plate, the latch plate rigidly anchored at one end thereof to the base plate thereby biasing the latch plate to a latching position, the base plate having an elongate opening for receiving the pin, the elongate opening being enlarged at one end for receiving the head portion of the pin therethrough and of reduced dimensions at an opposite end for receiving and establishing coupling engagement with the shank portion of the pin, the base plate radially supporting the pin, the latch plate having a retaining hole therein for receiving and establishing coupling engagement with the head portion of the pin, whereby the assembly is latched by inserting the pin through the enlarged end of the elongate opening to cause the latch plate to flex away from the base plate, and moving the pin toward the reduced end of the elongate opening until the head portion of the pin is received within the retaining hole of the latch plate and the latch plate resumes its biased latching position, and wherein loads are transferred radially between the pin of the first load supporting element and the base plate of the second load supporting element.

2. The quick-release latch assembly of claim 1, wherein the retaining hole of the latch plate overlies the reduced end of the elongate opening.

3. The quick-release latch assembly of claim 1, wherein the head portion of the pin is engaged by a distal edge of the retaining hole of the latch plate, and the shank portion of the pin is engaged by an edge of the reduced end of the elongate opening of the base plate.

4. The quick-release latch assembly of claim 1, wherein the latch plate further includes a cam for engagement with the head portion of the pin, the cam located adjacent the distal edge of the retaining hole and overlying the enlarged end of the elongate opening.

5. The quick-release latch assembly of claim 1, wherein the elongate opening has an upper continuous edge circumscribing the elongate opening at an upper surface of the body member and a lower continuous edge circumscribing the elongate opening at a lower surface of the body member, and wherein the upper and lower edges are rounded.

6. The quick-release latch assembly of claim 1, wherein the elongate opening has a pair of transition edges between the enlarged end and the reduced end, and wherein the transition edges are rounded.

7. The quick-release latch assembly of claim 1, wherein the latch plate further includes an upturned lip at a distal end thereof which diverges from the base plate.

8. The quick-release latch assembly of claim 1, wherein the first latch member and the second latch member are plastic.

9. The quick-release latch assembly of claim 8, wherein the latch plate is anchored to the base plate by welding.

10. The quick-release latch assembly of claim 1, wherein the shank and head portions of the pin are cylindrical and the retaining hole is circular.

11. The quick-release latch assembly of claim 1, wherein the first load supporting element is a backpack frame.

12. The quick-release latch assembly of claim 11, wherein the second load supporting element is a belt assembly.

13. A quick-release latch assembly comprising:

a first rigid load supporting element including a body member and a post extending outwardly therefrom, the post having an enlarged head offset from the body by a shank; and a second rigid load supporting element including a rigid, generally flat, thin, base member and a latch member, the latch member being a generally flat, thin plate having a proximal end fixedly secured to the base member and biased to remain in substantial contact therewith, the base member having a post receiving elongate opening therein, the elongate opening enlarged at one end for passing the head of the post therethrough and reduced at an opposite end for receiving and establishing coupling engagement with the shank of the post, the latch member having a retaining hole therein for receiving and establishing coupling engagement with the head of the post, the latch member having a distal end partly overlying the enlarged end opening of the base member and the retaining hole partly overlying the reduced end opening of the base member, wherein the assembly is latched by inserting the post through the enlarged end of the elongate opening to cause the latch member to move away from the retaining hole, and moving the post toward the reduced end of the elongate opening until the head of the post is received within the retaining hole of the latch member and the latch member resumes substantial contact with the base member, and wherein loads are transferred radially between the post of the first load supporting element and the base member of the second load supporting element.

14. The quick-release latch assembly of claim 13, wherein the first load supporting element is a backpack frame.

15. The quick-release latch assembly of claim 14, wherein the second load supporting element is a belt assembly.

* * * * *